April 5, 1966 G. VOGEL 3,244,811
AUTOMATIC PULSE DETECTOR ARRANGEMENT
Filed July 30, 1962
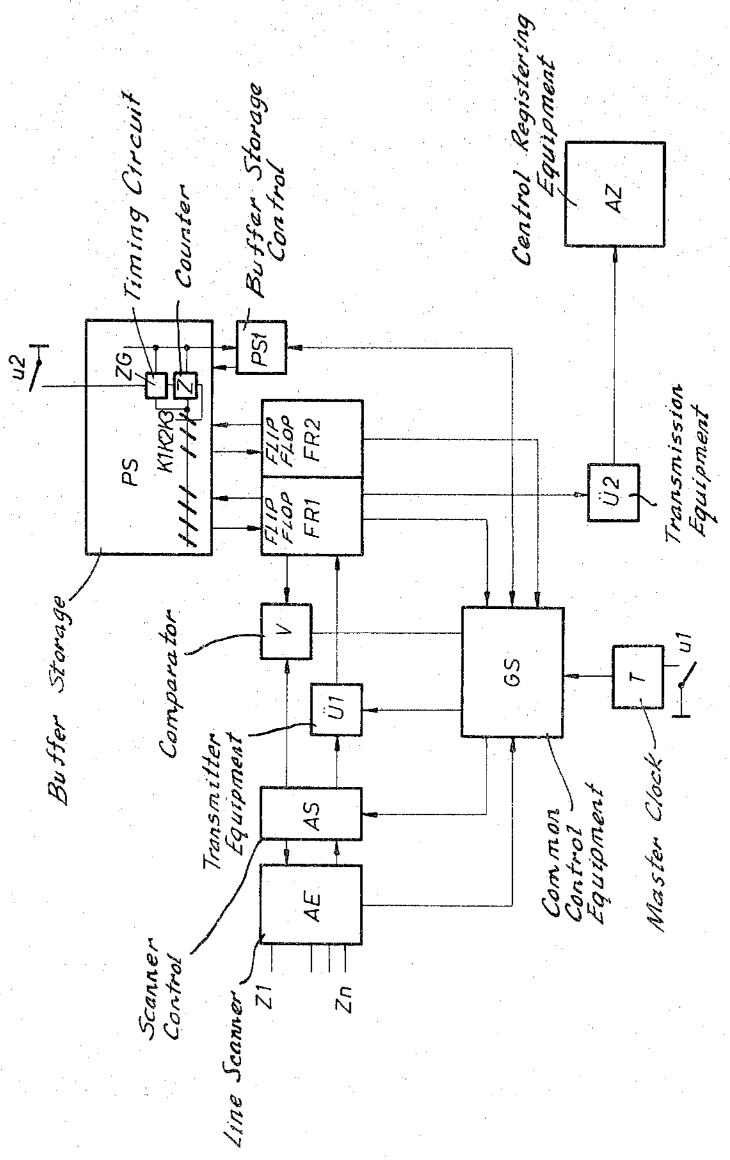
INVENTOR
G. VOGEL
BY [signature]
ATTORNEY 3,244,811
Patented Apr. 5, 1966

3,244,811

AUTOMATIC PULSE DETECTOR ARRANGEMENT

Georg Vogel, Schwieberdingen, Ludwigsburg, Germany, assignor to International Standard Electric Corporation, New York, N.Y., a corporation of Delaware Filed July 30, 1962, Ser. No. 213,295
Claims priority, application Germany, July 28, 1961, St 18,135
2 Claims. (Cl. 179—7)

The present invention relates to automatic pulse detector arrangements, particularly for detecting counting or metering pulses which may appear at random time intervals, individually or simultaneously over several lines.

The major difficulties arising in connection with an arrangement for effecting the automatic reception of these pulses is that noise pulses may inadvertently be recorded and that distorted pulses may inadvertently be recorded twice.

In cases where very large groups of lines are to be supervised, a problem arises at the central recording equipment. Due to the great number of information items to be recorded, this central equipment must be capable of operating at a very high recording speed. When the central recording equipment comprises complicated mechanical apparatus, faulty operations due to the high-speed of the recording or registering equipment appear to be unavoidable.

It is the object of the present invention to provide an arrangement for automatically detecting pulses arriving over different lines at random time positions. The inventive arrangement maintains the advantages of the conventional arrangements, but reduces the registerinng or recording speed until it is within the capabilities of the mechanical recording apparatus.

It is known to assign a matrix to the lines to be scanned, and to perform the scanning of this matrix in a point-after-point fashion. In these prior-art systems, the scanning cycle has to be chosen so that all lines are scanned during a period of time which is shorter than half the shortest undistorted pulse, but longer than the time of the switching transients appearing at both the beginning and the end of the pulse.

In prior systems an unambiguous output information regarding the pulses arriving over the lines of the scanned group is achievable with the aid of the additional three storage elements assigned to each row of the buffer storage. Noise pulses do not result in a recording, and a double recording of distorted pulses is avoided. However, this conventional type of arrangement requires an individual registering or recording process for each incoming pulse. The buffer storage merely avoids starting the central recording apparatus at the receipt of each pulse to be recorded. The buffer storage arrangement does not achieve a reduction of the recording speed.

The present invention is an improvement on the above-described prior art arrangement, and makes use of the fact that in each row of the buffer storage there is available a criterion for indicating that the pulse on the scanned line is terminated.

A substantial reduction of the recording speed is achieved by the inventive arrangement in that to each row of the buffer storage there is assigned a counter. At the end of a pulse the counter is stepped-on by the storage elements provided for marking or indicating the end of the pulse. When the counter reaches its end position there is effected the registration of the identification signal and of an additional signal indicating a number of pulses corresponding to the position of the counter. Each row of the buffer storage comprises a timing circuit which is energized upon seizure of the row. The timing circuit returns to normal as soon as no further pulse arrives within a predetermined period of time on the line whose identification signal is stored in the respective row of the buffer storage. When the timing circuit is reset both the identification signal and the additional signal indicating the position of the counter is registered at the central registering equipment, whereupon the respective row of the buffer storage is released.

In this way only a multiple is recorded during each time period. The additional signal attached to the identification signal indicates the number of pulses arriving over the respective line. With respect to the call metering in telephone systems only multiples of counting or metering pulses are recorded during a trunk call, whereas the individual counting or metering pulses in the case of local calls are registered after a predetermined period of time. The same also applies to the number of pulses appearing at the end of a trunk call exceeding the counting rate or several counting rates of the call meter.

According to a further embodiment of the invention, the counting rate of the counter or call meter of the buffer storage is adapted to the average fee of a trunk call. The fee for a trunk-call duration which is shorter than the average call duration may also be retained by being recorded in the central recording equipment. If a trunk call lasts longer than the average duration of a call, then a registering is initiated upon reaching the final position of the counter. Relative thereto the method may be chosen thus that the row of the buffer storage is erased or cancelled, and the counter is reset.

At the next incoming counting pulse a new free row of the buffer storage is seized. However, if the registration is terminated prior to the arrival of the new pulse, then it is also possible that only the counter is reset whereas the row of the buffer storage remains occupied. The timing circuit assigned to the respective row will remain unaffected.

The predetermined measuring time of the timing circuit is a little longer than the greatest time interval between two pulses arriving on one and the same line during a trunk call to ensure that the end of the call is recognized. The pulses stored in the counter of the row can be immediately registered upon arrival of the respective identification signal as soon as the timing circuit which has been energized by the seizure (i.e., by the first received counting pulse), has returned to normal. During this registration the row of the buffer storage is erased and the counter is reset to its initial position.

If a different kind of tariff (day and night tariff), then, to effect the tariff changeover, the counting rate of the counters may be adapted to the new average call fee, and the timing circuits may be switched over to the new time conditions. If the timely sequence of the pulses is slower, then, according to a further embodiment of the invention, also the pulse duration may be enlarged, and the scanning cycle may be slowed down correspondingly.

The invention will now be explained in detail with reference to a basic circuit diagram shown in block diagram form. This description is not particularly concerned with the scanning of the lines and the determination of the incoming pulses by an indicator assigned to the scanning matrix. This problem may be solved in various ways which are known per se. For example, there may be used a diode matrix which is controlled by binary counters and scanned in a point-by-point manner. The transmission of a pulse is effected in the form of an identification signal obtained from the position of the scanning counter. The thus obtained identification signals are each time stored in one row of the buffer storage. The processes performed up to the storing into the buffer storage belong to the prior art as exemplified in U.S. Patent No. 3,025,351, entitled "Equipment for Performing a Complex Sequence of Operations," which issued on March 13, 1962, and is assigned to the assignee of this invention and do not require any further explanation. For this reason only the cooperation among the scanning device AE, AS, the comparator V, the testing equipments FR1, FR2, the counting devices Z and the time-metering devices ZG are described in detail hereinafter.

The scanning device AE is any well known type of non-storing scanner which continually scans the individual lines to check their calling, dialing and release conditions. The scanning counter AS is a cyclically rotating counter which indicates the coordinates being scanned by the scanning device AE. Scanning counter AS has positions corresponding to the columns or rows of the scanning device AE. The buffer storage PS may be a ferrite core matrix which is controlled by a multistep counter PST which selects the buffer storage rows. The buffer storage is arranged to record the information appearing on the lines scanned by scanning device AE. In addition to the usual cores per row, three additional cores K1, K2 and K3 are provided in each row and, as will be described hereinafter, are arranged to record special pulses such as metering or tariff pulses.

It should be noted that any non-storing type scanner can be used, the requirement being that the scanner attaches itself sequentially to the lines to determine whether or not they are marked with a pulse. The scanner in cooperation with the scanning counter must be able to also determine the line location, such as, for example, by row and column.

The control circuit PS*t* of the buffer storage substantially consists of a counter for determining which one of the rows of the buffer storage is to be interrogated or read-out, or erased respectively. The information as read-out from the buffer storage is transferred to the flip-flop storages FR during the scanning of the buffer storage. The line number is stored in FR1, and the information as read-out from the additional cores is stored in FR2. Between scanner control AS and storage FR1 there are arranged the comparator V and the transmitting device Ü1. With the aid of comparator V it is possible to compare the position of the counter in control AS with the number as stored in storage FR1. The comparator produces an output signal in cases where the position of the counter in AS and the number stored in FR1 are identical. The transmission equipment Ü1 operates to transfer the position of the counter in AS to the storage device FR1 responsive to signals received from common control device GS. The transmission equipment Ü2 serves to feed the line number and additional information with respect to which an associated pulse has been detected to the registering equipment AZ upon interrogation. This common control device GS sequentially transfers the clock pulses as produced by the master clock T to the remaining parts of the arrangement. The control device GS comprises some flip-flop stages and gate circuits. The control circuit PST, the flip-flop storages FR, the comparator transmitting device Ü1 timer T and control device GS are well known items of apparatus and may be of the type disclosed in chapters 8, 12, 13 and 16 of the book "Understanding Digital Computers," by Paul Siegel, published by John Wiley and Sons, Inc.

In the following there will now be described the operational sequence relating to the detection of pulses.

The scanning of the lines is stopped as soon as an incoming pulse is detected on the scanned line by means of the scanning device AE and the scanning counter AS. The position of the counter AS corresponds to that of the identification signal assigned to the line. Under the control of the common control device GS and the control device PS*t* of the buffer storage, all identification signals stored in the buffer storage are transferred to the flip-flop storage FR one at a time in turn. At the first scanning of a pulse on the line, an identity with the already registered identification signals cannot be detected. It is noted that after each comparison the identification signal sent to the flip-flop storage device FR, is again rerecorded into the buffer storage. No comparison can take place since no previous storage has been effected and the control device PS*t* of the buffer storage PS proceeds to the next free row, and the position of the counter AS is recorded with the aid of Ü1 and FR1.

Subsequent to this transfer of the position of the counter AS to the flip-flop storage device FR1, there exists an identity between the information stored in FR1 and AS, this identification signal is recorded into the selected free row of the buffer storage. At the same time, via FR2, the associated storage element K1 of the respective row is also marked. Thus, a beginning of a pulse signal is derived when element K1 is the only element of the three additional elements marked.

After this information has been recorded the scanning of the lines continues until the cycle extending over all lines, has been terminated. This scanning cycle is followed by a separate test cycle during which all information stored in the buffer storage, is checked. The previously recorded information shows that, during the last interrogation of the line marked by the identification signal, the detection of the beginning of a pulse occurred. In order to determine, during the next scanning cycle, whether the applied pulse is a short noise pulse or a pulse of the required minimum duration, the second one of the assigned storaged elements K2 is marked during this test cycle.

During the following scanning cycle a new comparison is performed. During the preceding test cycle of the buffer storage elements K1 and K2 were marked. During the comparison which takes place now, the storage element K1 is erased if the pulse is still applied. During the following test cycle of the buffer storage, K2 will be found to be marked. This indicates a continuation of the pulse. If both K1 and K2 are found marked, a noise signal is indicated. In addition the third storage element K3 in order to be able to detect the end of the pulse during the following or any later cycle of scanning the lines. If the pulse continues to be applied, then, during each comparison, storage element K3 is erased, and it is remarked during the following test cycle. However, if the pulse is terminated, there is no positive comparison with the respective row. During the following test cycle, therefore, K2 and K3 are marked indicating pulse termination. This means that the pulse is terminated. During the testing process the storage elements K1 to K3 are erased, the timing circuit ZG is switched on, and the counter Z is brought into the position "1." With the subscriber of this line conducting a local call, only one pulse is given onto the counting wire Z1 . . . Z*n* assigned to the subscriber, at the end of the conversation. After a period of time determined by the timing circuit ZG, the latter is returned to normal and causes the registration of the identification signal together with an additional signal corresponding to the position of the line counter Z of the buffer storage. In the aforementioned case this is an additional signal corresponding to the value "1." The return time of the counting circuit is adapted to the greatest interval between two pulses arriving on the same line during a trunk call. In this way it is possible to combine the pulses arriving during a trunk call, and to retain them at the central recording equipment AZ in the form of a greater charge unit. In this connection the counting rate of the counter Z should appropriately be adapted to the average fee for a trunk call. Since, after the first pulse in the case of a trunk call, the timing circuit ZG is not reset to normal, it should be noted that a recording is likewise initiated upon reaching the end position of the counter. If the recording has been carried out before a new pulse has arrived on the respective line, then only the counter is brought into its initial position; the identification signal of the line, however, is not erased, so that this row will again participate in the new comparison. However, it is also conceivable to subject the information as obtained from the buffer storage, again to an intermediate storing and to feed this information to the recording equipment only during a cycle which is independent of the processes mentioned hereinbefore. Relative thereto it is still to be mentioned that the timing circuit ZG is re-started by each incoming pulse, so that the time-metering will commence respectively from this time position onwards.

In the case of a telephone system in which, in dependence upon the time of day, there are used different tariffs, it seems advisable when switching over the counting-pulse transmitter, to also adapt the counting rate of the counters as well as the predetermined reset time of the timing circuits to the new time conditions. This is denoted by the contact *u2* at both the timing circuit ZG and the counter Z. If, in connection with this change-over of the tariff, there is also changed the duration of the pulses, then also the scanning cycle of AE and AS may be adapted to the new time conditions. When increasing the slowest counting rhythm or clock pulse during a trunk call, e.g. from 15 to 45 seconds, it will be necessary to fix the reset time of the timing circuit e.g. at 20 or 60 seconds respectively. In the case of an average duration of a call of 3 minutes this will result in a counting rate of the counter Z of 12 or 4 respectively. For the sake of simplicity there will be chosen a counting rate of 10 or 5 respectively. In this way, during a trunk call, there are registered each time 10- or 5-fold charge units respectively. This may be recognized from the fact that while registering the identification signal, there is also recorded a corresponding additional signal. If, in the course of the tariff changeover, there is not only slowed down the counting rhythm, but if also the pulses are extended in the same ratio, it is also possible to reduce or slow-down the scanning cycle of AE and AS in the same ratio. In all cases the described measures and arrangements will serve to relieve the central registering equipment. A further advantage resides in the fact that during the evaluation of the recorded charge information, a substantially smaller amount of recorded information has to be taken into consideration, which results in a substantial reduction of the evaluation time.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. Pulse detection and storage equipment for use in telecommunication systems comprising a plurality of lines, a scanning matrix for scanning said lines to detect the presence of digit pulses thereon, a buffer storage comprising a plurality of rows each having a plurality of storage elements therein for storing the identity of line being scanned, a group of additional storage elements per row for storing indications of the beginning, the duration and the termination, respectively, of each pulse of each digit appearing on the line being scanned, counting means associated with each said row and controlled by said additional storage elements to record the cumulative number of pulses in each digit appearing on the line being scanned, central registering equipment, and means for transferring an indication of the number of pulses in each digit from said counting means to said central registering equipment.

2. Pulse detection and storage equipment as set forth in claim 1 wherein timing means is associated with each said counting means for indicating the end of each series of pulses of each digit and for controlling said counting means to effect the said transfer to said central registering equipment.

References Cited by the Examiner

UNITED STATES PATENTS

| | | | |
|---|---|---|---|
| 2,833,858 | 5/1958 | Grondin | 178—70 |
| 2,913,527 | 11/1959 | Wright et al. | 179—7 |
| 2,956,127 | 10/1960 | Blashfield | 179—7.1 |
| 3,025,351 | 3/1962 | Wright et al. | 179—7.1 |
| 3,067,290 | 12/1962 | Greenway et al. | 179—7 |
| 3,090,836 | 5/1963 | Bezdel | 179—18 X |

ROBERT H. ROSE, *Primary Examiner.*

WALTER L. LYNDE, *Examiner.*

H. BOOHER, J. W. JOHNSON, *Assistant Examiners.*